(12) United States Patent
Ishikawa et al.

(10) Patent No.: US 11,339,243 B2
(45) Date of Patent: May 24, 2022

(54) EPOXY RESIN COMPOSITION, MOLDING MATERIAL FOR FIBER-REINFORCED COMPOSITE MATERIAL, AND FIBER-REINFORCED COMPOSITE MATERIAL

(71) Applicant: Toray Industries, Inc., Tokyo (JP)

(72) Inventors: Norikazu Ishikawa, Nagoya (JP);
Kazunori Hondo, Nagoya (JP);
Nobuyuki Tomioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/270,153

(22) PCT Filed: Aug. 21, 2019

(86) PCT No.: PCT/JP2019/032645
§ 371 (c)(1),
(2) Date: Feb. 22, 2021

(87) PCT Pub. No.: WO2020/054340
PCT Pub. Date: Mar. 19, 2020

(65) Prior Publication Data
US 2021/0198414 A1    Jul. 1, 2021

(30) Foreign Application Priority Data
Sep. 10, 2018 (JP) .............................. JP2018-168779

(51) Int. Cl.
*C08G 18/58* (2006.01)
*C08G 18/12* (2006.01)
(Continued)

(52) U.S. Cl.
CPC ............. *C08G 18/58* (2013.01); *C08G 18/12* (2013.01); *C08G 18/73* (2013.01); *C08G 18/7657* (2013.01); *C08G 59/22* (2013.01); *C08G 59/32* (2013.01); *C08J 5/042* (2013.01); *C08J 5/24* (2013.01); *C08J 2363/00* (2013.01)

(58) Field of Classification Search
None
See application file for complete search history.

(56) References Cited

U.S. PATENT DOCUMENTS

| | | | | |
|---|---|---|---|---|
| 4,916,018 A * | 4/1990 | Goel | ..................... | B32B 7/12 |
| | | | | 156/182 |
| 2016/0237273 A1 | 8/2016 | Oka et al. | | |
| 2020/0140633 A1* | 5/2020 | Oota | .................... | C08G 59/56 |

FOREIGN PATENT DOCUMENTS

| JP | S58-191723 A | 11/1983 |
|---|---|---|
| JP | S62-131011 A | 6/1987 |

(Continued)

*Primary Examiner* — Megan McCulley
(74) *Attorney, Agent, or Firm* — DLA Piper LLP (US)

(57) ABSTRACT

An epoxy resin composition contains components (A)-(C), and satisfies the expressions below: Component (A): an aliphatic epoxy resin having one hydroxyl group and two to three epoxy groups in one molecule; Component (B): an aliphatic epoxy resin having no hydroxyl group and three epoxy groups in one molecule; Component (C): a polyisocyanate compound; $0.125 \leq A/B \leq 3$; and $0.2 < (A+B)/T \leq 0.8$ (A: parts by mass of component (A), B: parts by mass of component (B), and T: total parts by mass of the epoxy resins in the epoxy resin composition).

10 Claims, 1 Drawing Sheet

(51) Int. Cl.
*C08G 18/73* (2006.01)
*C08G 18/76* (2006.01)
*C08G 59/22* (2006.01)
*C08G 59/32* (2006.01)
*C08J 5/04* (2006.01)
*C08J 5/24* (2006.01)

(56) References Cited

FOREIGN PATENT DOCUMENTS

| | | |
|---|---|---|
| JP | H04-88011 A | 3/1992 |
| JP | H05-320303 A | 12/1993 |
| JP | 2003-002990 A | 1/2003 |
| JP | 2010-053469 A | 3/2010 |
| JP | 2014-156505 A | 8/2014 |
| JP | 2015-059200 A | 3/2015 |
| WO | 2015/046030 A1 | 4/2015 |

* cited by examiner

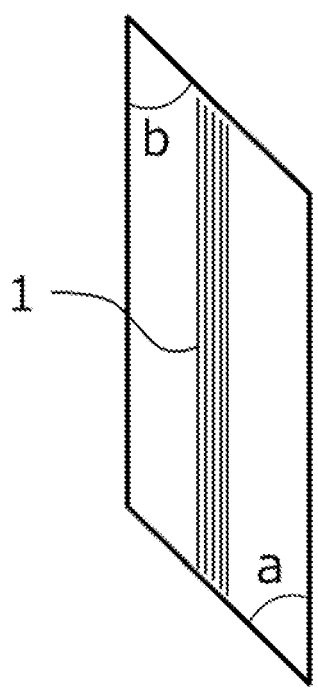

EPOXY RESIN COMPOSITION, MOLDING MATERIAL FOR FIBER-REINFORCED COMPOSITE MATERIAL, AND FIBER-REINFORCED COMPOSITE MATERIAL

TECHNICAL FIELD

This disclosure relates to an epoxy resin composition preferably used in fiber-reinforced composite materials such as aerospace members and automobile members, as well as to a molding material for a fiber-reinforced composite material and a fiber-reinforced composite material containing the epoxy resin composition.

BACKGROUND

Fiber-reinforced composite materials containing a reinforcing fiber and a matrix resin may have a material design taking advantage of the benefits of the reinforcing fiber and the matrix resin, and thus the applications of the fiber-reinforced composite materials are expanding to the fields of aerospace, automobiles, sports, general industry and the like. The fiber-reinforced composite materials are produced by a hand lay-up method, a filament winding method, a pultrusion method, a resin transfer molding (RTM) method, an autoclave molding method of a prepreg, a press forming method of a molding material for a fiber-reinforced composite material or the like.

Examples of the molding material for a fiber-reinforced composite material used in the press forming method include prepregs, tow prepregs, bulk molding compounds (BMCs), and sheet molding compounds (SMCs). These molding materials for a fiber-reinforced composite material are obtained by impregnating a reinforcing fiber with a matrix resin. The molding materials for a fiber-reinforced composite material are often wound into a roll using a bobbin or the like from the viewpoint of handleability. A molding material for a fiber-reinforced composite material having little flexibility retains the roll shape even after being unwound from the bobbin, and it is difficult to lay-up such molding materials in a flat shape. Meanwhile, a sufficiently flexible molding material for a fiber-reinforced composite material gets out of the roll shape immediately after being unwound from the bobbin, and it is possible to lay-up such molding materials in a flat shape. Moreover, such molding materials easily follow the shape of the mold and have excellent shapability. To meet the recent increasing demand for weight reduction of aircraft and automobiles, it is required to apply fiber-reinforced composite materials not only to secondary structures with simple shapes but also to primary structures with more complicated shapes. Therefore, flexibility of the molding materials for a fiber-reinforced composite material is becoming more and more important.

For the reinforcing fiber, a glass fiber, an aramid fiber, a carbon fiber, a boron fiber or the like is used. For the matrix resin, either a thermosetting resin or a thermoplastic resin is used, but a thermosetting resin easy to impregnate into the reinforcing fiber is often used. For the thermosetting resin, an epoxy resin, an unsaturated polyester resin, a vinyl ester resin, a phenol resin, a bismaleimide resin, a cyanate resin or the like is used. Among them, epoxy resins are widely used from the viewpoint of adhesiveness to the reinforcing fiber, dimensional stability, and mechanical properties such as strength and stiffness of the obtained fiber-reinforced composite material.

When an epoxy resin is used as a matrix resin, the epoxy resin is required to be thickened to a sufficient level so that the resin may not singly flow out after being impregnated into the reinforcing fiber. Examples of a technique known as such a thickening method include a technique of dissolving or swelling thermoplastic particles or a thermoplastic resin in an epoxy resin, a technique of reacting an epoxy group with an amine or an acid anhydride to form a crosslinked structure, and a technique of reacting an isocyanate with a hydroxyl group in an epoxy resin or a hydroxyl group in an alcohol to form a high-molecular-weight polyurethane in a system. Among them, the technique of reacting an isocyanate with a hydroxyl group is preferably used from the viewpoint of impregnating properties into the reinforcing fiber and the viscosity stability during the storage.

An object of making the technique of reacting an isocyanate with a hydroxyl group, that is, a thickening method for an epoxy resin, have a high level of practicality is difficult to accomplish merely by excellent impregnating properties into a reinforcing fiber and viscosity stability during the storage, and it is specifically required to satisfy the following four conditions at once. First, the epoxy resin composition has a sufficiently low viscosity to smoothly impregnate into the reinforcing fiber. Second, the viscosity of the epoxy resin composition after thickening is controlled in the optimum range for a molding material for a fiber-reinforced composite material containing the epoxy resin composition to be easily unwound from a roll shape during the storage and to have flexibility with excellent shapability. Third, the variation in viscosity of the epoxy resin composition after thickening due to the temperature rise is small for a molding material for a fiber-reinforced composite material containing the epoxy resin composition to sufficiently flow to the end of the shape of the mold regardless of the molding temperature during press forming of the molding material. Fourth, the cured resin obtained by curing the epoxy resin composition is excellent in heat resistance to provide a fiber-reinforced composite material with high shape stability even in a high-temperature environment.

To cope with such situation, an epoxy resin composition containing an epoxy resin containing sorbitol polyglycidyl ether containing 2 or more hydroxyl groups in a molecule, and 4,4'-diphenylmethane diisocyanate has been disclosed (Japanese Patent Laid-open Publication No. H05-320303). Further, an epoxy resin composition that contains an epoxy resin containing 1 or more hydroxyl groups and 2 or more epoxy groups in a molecule, and 4,4'-diphenylmethane diisocyanate has been disclosed (Japanese Patent Laid-open Publication No. S58-191723). Further, an epoxy resin composition that contains a solid bisphenol A epoxy resin containing 2 or more hydroxyl groups and 2 epoxy groups in a molecule, and an aliphatic isocyanate having a heterocycle has been disclosed (Japanese Patent Laid-open Publication No. H04-88011).

As for the epoxy resin composition described in JP '303, the cured resin obtained by curing the epoxy resin composition is excellent in heat resistance. However, due to the high viscosity of sorbitol polyglycidyl ether, the epoxy resin composition does not sufficiently impregnate into the reinforcing fiber. Further, due to the high viscosity of the epoxy resin composition after thickening, the molding material for a fiber-reinforced composite material containing the epoxy resin composition is so hard that it is difficult to unwind the molding material from a roll shape during storage, and is also insufficient in flowability during molding.

As for the epoxy resin composition described in JP '723, the epoxy resin containing 1 or more hydroxyl groups and the polyhydric alcohol have low viscosity, and the epoxy resin composition is excellent in impregnating properties into the reinforcing fiber. However, due to the low viscosity of the epoxy resin composition after thickening, the molding material for a fiber-reinforced composite material containing the epoxy resin composition is so sticky that it is difficult to unwind the molding material, and the resin singly flows out during molding, and the molding material is also insufficient in flowability during molding.

As for the epoxy resin composition described in JP '011, the cured resin obtained by curing the epoxy resin composition is excellent in heat resistance. However, due to the high viscosity of the solid bisphenol A epoxy resin, the epoxy resin composition is insufficient in impregnating properties into the reinforcing fiber. Further, due to the high viscosity of the epoxy resin composition after thickening, the molding material for a fiber-reinforced composite material containing the epoxy resin composition is so hard that it is difficult to unwind the molding material, and the molding material is also insufficient in flowability during molding.

As described above, it is difficult to satisfy all the above-mentioned four conditions by conventional techniques. In particular, there has been no technique that satisfies the second condition, that is, the molding material for a fiber-reinforced composite material containing the epoxy resin composition is easily unwound from a roll shape during the storage and exhibits flexibility with excellent shapability.

Therefore, it could be helpful to provide an epoxy resin composition that is excellent in impregnating properties into a reinforcing fiber, has a viscosity controlled in an optimum range after thickening, has a small variation in viscosity due to the temperature rise, and is excellent in heat resistance after curing. It could also be helpful to provide a molding material for a fiber-reinforced composite material that is excellent in flexibility during handling and flowability during press forming by using the epoxy resin composition, and to provide a fiber-reinforced composite material excellent in heat resistance and mechanical properties by using the molding material for a fiber-reinforced composite material.

SUMMARY

We thus provide:

An epoxy resin composition containing components (A) to (C):

the component (A): an aliphatic epoxy resin having 1 hydroxyl group and 2 or more and 3 or less epoxy groups in a molecule;

the component (B): an aliphatic epoxy resin having 0 hydroxyl groups and 3 epoxy groups in a molecule; and the component (C): a polyisocyanate compound, the epoxy resin composition satisfying formulae shown below:

$$0.125 \leq A/B \leq 3 \text{ and } 0.2 < (A+B)/T \leq 0.8, \text{ wherein}$$

A is parts by mass of the component (A), B is parts by mass of the component (B), and T is total parts by mass of an epoxy resin in the epoxy resin composition.

The molding material for a fiber-reinforced composite material contains the epoxy resin composition and a reinforcing fiber.

Further, the fiber-reinforced composite material contains a cured resin of the epoxy resin composition and a reinforcing fiber.

We thus provide an epoxy resin composition that is excellent in impregnating properties into a reinforcing fiber, has a viscosity of the epoxy resin controlled in an optimum range after thickening, has a small variation in viscosity due to the temperature rise, and is excellent in heat resistance after curing. Further, we provide a molding material for a fiber-reinforced composite material that is excellent in flexibility during handling and flowability during press forming by using the epoxy resin composition, and a fiber-reinforced composite material excellent in heat resistance and mechanical properties by using the molding material for a fiber-reinforced composite material.

BRIEF DESCRIPTION OF THE DRAWING

The Drawing is a schematic view of an inside of a bundle assembly.

DESCRIPTION OF REFERENCE SIGN

1: Reinforcing fiber

DETAILED DESCRIPTION

Hereinafter, desirable examples will be described. First, the epoxy resin composition will be described.

Our epoxy resin composition contains components (A) to (C):

the component (A): an aliphatic epoxy resin having 1 hydroxyl group and 2 or more and 3 or less epoxy groups in a molecule;

the component (B): an aliphatic epoxy resin having 0 hydroxyl groups and 3 epoxy groups in a molecule; and the component (C): a polyisocyanate compound, and the epoxy resin composition satisfies:

$$0.125 \leq A/B \leq 3 \text{ and } 0.2 < (A+B)/T \leq 0.8, \text{ wherein}$$

A is parts by mass of the component (A), B is parts by mass of the component (B), and T is total parts by mass of an epoxy resin in the epoxy resin composition.

The component (A) imparts excellent flexibility and flowability to a molding material for a fiber-reinforced composite material containing the epoxy resin composition. The component (A) is not particularly limited as long as it is an aliphatic epoxy resin having 1 hydroxyl group and 2 or more and 3 or less epoxy groups in a molecule, and a known aliphatic epoxy resin may be used. Examples of the aliphatic epoxy resin used as the component (A) include those resulting from glycidyl etherification of at least 2 hydroxyl groups among the hydroxyl groups of an aliphatic alcohol. The aliphatic alcohol as a raw material of the component (A) is preferably an aliphatic alcohol having 3 or more and 4 or less hydroxyl groups. Examples of the aliphatic alcohol having 3 hydroxyl groups include glycerin, trimethylolpropane, butanetriol, cyclohexanetriol, and adamantanetriol. Examples of the aliphatic alcohol having 4 hydroxyl groups include diglycerol and pentaerythritol. These aliphatic alcohols having 3 hydroxyl groups and aliphatic alcohols having 4 hydroxyl groups may be used alone or in combination of two or more.

Examples of commercially available products containing the component (A) made from glycerin include "DENACOL (registered trademark)" EX-313 (manufactured by Nagase ChemteX Corporation), "DENACOL (registered trademark)" EX-314 (manufactured by Nagase ChemteX Corporation), "EPIOL (registered trademark)" G-100 (manufactured by NOF CORPORATION), and SR-GLG (manufactured by Sakamoto Yakuhin Kogyo Co., Ltd.).

Examples of commercially available products containing the component (A) made from trimethylolpropane include "DENACOL (registered trademark)" EX-321 (manufactured by Nagase ChemteX Corporation) and SR-TMP (manufactured by Sakamoto Yakuhin Kogyo Co., Ltd.).

Examples of commercially available products containing the component (A) made from pentaerythritol include "DENACOL (registered trademark)" EX-411 (manufactured by Nagase ChemteX Corporation).

Examples of commercially available products containing the component (A) made from diglycerol include "DENACOL (registered trademark)" EX-412 (manufactured by Nagase ChemteX Corporation) and SR-DGE (manufactured by Sakamoto Yakuhin Kogyo Co., Ltd.).

From the viewpoint of heat resistance, the component (A) is more preferably an aliphatic epoxy resin represented by general formula (2):

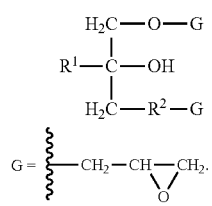

(2)

In general formula (2), $R^1$ represents H or an aliphatic chain having a carbon number of 1 or more and 6 or less, and optionally contains a cyclic structure and/or a heteroatom in the aliphatic chain. $R^2$ represents O or an aliphatic chain having a carbon number of 1 or more and 6 or less, and optionally contains a cyclic structure and/or a heteroatom in the aliphatic chain.

Examples of the heteroatom in $R^1$ and $R^2$ in general formula (2) include an oxygen atom, a nitrogen atom, a sulfur atom, and a halogen atom.

Further, the total carbon number in the molecule of the aliphatic epoxy resin represented by general formula (2) is preferably 9 or more and 30 or less, and more preferably 9 or more and 20 or less. It is preferable that the total carbon number in the molecule of the aliphatic epoxy resin represented by general formula (2) be 9 or more, because a polymer is produced by the reaction between the aliphatic epoxy resin represented by general formula (2) and the polyisocyanate compound, and the epoxy resin composition is likely to be sufficiently thickened. Further, it is preferable that the total carbon number in the molecule of the aliphatic epoxy resin represented by general formula (2) be 30 or less, because the advantage of low resin viscosity of the aliphatic epoxy resin represented by general formula (2) is likely to be exhibited, and the epoxy resin composition is impregnated into the reinforcing fiber more smoothly.

The component (B) imparts excellent flexibility to a molding material for a fiber-reinforced composite material containing the epoxy resin composition, and imparting high heat resistance to the fiber-reinforced composite material containing the epoxy resin composition. The component (B) is not particularly limited as long as it is an aliphatic epoxy resin having 0 hydroxyl groups and 3 epoxy groups in a molecule, and a known aliphatic epoxy resin may be used. Examples of the aliphatic epoxy resin used as the component (B) include those resulting from glycidyl etherification of 3 hydroxyl groups of an aliphatic alcohol. The aliphatic alcohol as a raw material of the component (B) is preferably an aliphatic alcohol having 3 hydroxyl groups. Examples of the aliphatic alcohol having 3 hydroxyl groups include glycerin, trimethylolpropane, butane triol, cyclohexanetriol, and adamantanetriol. They may be used alone or in combination of two or more.

Examples of commercially available products containing the component (B) made from glycerin include "DENACOL (registered trademark)" EX-313 (manufactured by Nagase ChemteX Corporation), "DENACOL (registered trademark)" EX-314 (manufactured by Nagase ChemteX Corporation), "EPIOL (registered trademark)" G-100 (manufactured by NOF CORPORATION), and SR-GLG (manufactured by Sakamoto Yakuhin Kogyo Co., Ltd.).

Examples of commercially available products containing the component (B) made from trimethylolpropane include "DENACOL (registered trademark)" EX-321 (manufactured by Nagase ChemteX Corporation) and SR-TMP (manufactured by Sakamoto Yakuhin Kogyo Co., Ltd.).

In the epoxy resin composition, the component (B) is preferably an aliphatic epoxy resin represented by general formula (1). When the component (B) is an epoxy resin having the following structure, higher heat resistance is imparted to a cured resin of the epoxy resin composition. The total carbon number in the molecule of the aliphatic epoxy resin represented by general formula (1) is preferably 12 or more and 30 or less, and more preferably 12 or more and 20 or less. It is preferable that the total carbon number in the molecule of the aliphatic epoxy resin represented by general formula (1) be 12 or more, because the aliphatic epoxy resin represented by general formula (1) has high viscosity, and the epoxy resin composition is likely to be sufficiently thickened. Further, it is preferable that the total carbon number in the molecule of the aliphatic epoxy resin represented by general formula (1) be 30 or less, because the aliphatic epoxy resin represented by general formula (1) tends have low viscosity, and the epoxy resin composition is impregnated into the reinforcing fiber more smoothly:

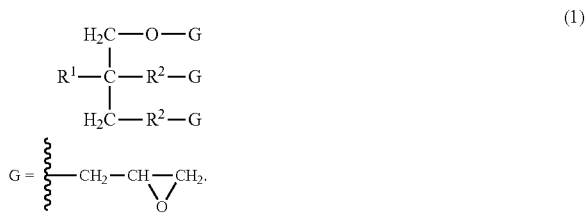

(1)

In general formula (1), le represents H or an aliphatic chain having a carbon number of 1 or more and 6 or less, and optionally contains a cyclic structure and/or a heteroatom in the aliphatic chain. $R^2$ represents O or an aliphatic chain having a carbon number of 1 or more and 6 or less, and optionally contains a cyclic structure and/or a heteroatom in the aliphatic chain.

Examples of the heteroatom in $R^1$ and $R^2$ in general formula (1) include an oxygen atom, a nitrogen atom, a sulfur atom, and a halogen atom.

Parts by mass of the components (A) and (B) in the epoxy resin composition need to satisfy formulae shown below for the epoxy resin composition to satisfy all the above-mentioned four conditions:

$$0.125 \leq A/B \leq 3 \text{ and } 0.2 < (A+B)/T \leq 0.8$$

A is parts by mass of the component (A), and B is parts by mass of the component (B).

T is total parts by mass of an epoxy resin in the epoxy resin composition.

The value of A/B satisfies 0.125≤A/B≤3, more preferably satisfies 0.125≤A/B≤2, still more preferably satisfies 0.125≤A/B≤1.5, and even more preferably satisfies 0.125≤A/B≤1. When the value of A/B is 0.125 or more, a polymer is formed by the reaction between the hydroxyl group in the molecule of the component (A) and the polyisocyanate compound, and the epoxy resin composition is sufficiently thickened. When the value of AB is 3 or less, the epoxy resin composition has low viscosity, and is smoothly impregnated into the reinforcing fiber.

The value of (A+B)/T is required to satisfy 0.2<(A+B)/T≤0.8, and more preferably satisfies 0.2<(A+B)/T≤0.7, and still more preferably satisfies 0.2<(A+B)/T≤0.65. When the value of (A+B)/T is more than 0.2, the epoxy resin composition has low viscosity, and is smoothly impregnated into the reinforcing fiber. In addition, when the value of (A+B)/T is 0.8 or less, a cured resin of the epoxy resin composition exhibits high heat resistance.

The component (C) is a polyisocyanate compound. The component (C) is not particularly limited as long as it has, in a molecule, 2 or more isocyanate groups on average, and known aliphatic isocyanates and aromatic isocyanates may be used. Examples of the aliphatic isocyanate used as the polyisocyanate compound of the component (C) include ethylene diisocyanate, trimethylene diisocyanate, dodecamethylene diisocyanate, hexamethylene diisocyanate, tetramethylene diisocyanate, pentamethylene diisocyanate, propylene-1,2-diisocyanate, 2,3-dimethyltetramethylene diisocyanate, butylene-1,2-diisocyanate, butylene-1,3-diisocyanate, 1,4-diisocyanate hexane, cyclopentene-1,3-diisocyanate, isophorone diisocyanate, 1,2,3,4-tetraisocyanate butane, and butane-1,2,3-triisocyanate. Examples of the aromatic isocyanate used as the polyisocyanate compound of the component (C) include aromatic isocyanates such as p-phenylene diisocyanate, 1-methylphenylene-2,4-diisocyanate, naphthalene-1,4-diisocyanate, tolylene diisocyanate, diphenyl-4,4-diisocyanate, benzene-1,2,4-triisocyanate, xylylene diisocyanate, diphenylmethane diisocyanate (MDI), diphenylpropane diisocyanate, tetramethylene xylene diisocyanate, and polymethylene polyphenyl polyisocyanate, and those having a structure in which the above-mentioned aromatic isocyanates are linked with a methylene group or the like. It is also possible to use a prepolymer obtained by prepolymerizing the above-mentioned polyisocyanate compounds with a polyol compound. These polyisocyanate compounds and the like may be used alone or in combination of two or more. The isocyanate compound preferably includes a polyisocyanate compound having 3 or more and 6 or less isocyanate groups in a molecule. When the number of isocyanate groups is 3 or more, the epoxy resin composition is likely to be thickened sufficiently. In addition, when the number of isocyanate groups is 6 or less, the molding material for a fiber-reinforced composite material containing the epoxy resin composition is likely to exhibit excellent flexibility.

In the epoxy resin composition, it is preferable that the component (C) satisfy:

$$1 \leq I/W \leq 2$$

wherein I is the number of isocyanate groups of the component (C) in the epoxy resin composition, and W is the total number of hydroxyl groups in the epoxy resin in the epoxy resin composition.

The value of I/W more preferably satisfies $1.1 \leq I/W \leq 2$, and still more preferably satisfies $1.2 \leq I/W \leq 2$. When the value of I/W is 1 or more, the epoxy resin composition is likely to be sufficiently thickened while being prepared under high temperature and high humidity conditions even when some of the isocyanate groups among the isocyanate groups in the component (C) do not react with the hydroxyl group in the epoxy resin but react with the moisture in the air. In addition, when the value of I/W is 2 or less, the molding material for a fiber-reinforced composite material containing the epoxy resin composition is likely to exhibit excellent flexibility.

It is preferable that the epoxy resin composition further contain a component (D), and satisfy a formula as shown later.

When the epoxy resin composition contains the component (D), the molding material for a fiber-reinforced composite material containing the epoxy resin composition is likely to have improved flowability during press forming. The component (D) is not particularly limited as long as it is an epoxy resin having 2 or more hydroxyl groups and 2 or more epoxy groups in a molecule, and a known aromatic epoxy resin or a known aliphatic epoxy resin may be used. Examples of the aromatic epoxy resin used as the component (D) include a bisphenol A epoxy resin having 2 or more hydroxyl groups and 2 epoxy groups, a bisphenol F epoxy resin having 2 or more hydroxyl groups and 2 epoxy groups, a bisphenol S epoxy resin having 2 or more hydroxyl groups and 2 epoxy groups, a phenol novolac epoxy resin having 2 or more hydroxyl groups and 2 epoxy groups, and a cresol novolac epoxy resin having 2 or more hydroxyl groups and 2 epoxy groups. Examples of the aliphatic epoxy resin used as the component (D) include those resulting from glycidyl etherification of 2 or more hydroxyl groups among the hydroxyl groups of an aliphatic alcohol having 4 or more hydroxyl groups. As for the aliphatic alcohol as a raw material of the component (D), examples of the aliphatic alcohol having 4 hydroxyl groups include pentaerythritol and diglycerol. Examples of the aliphatic alcohol having 6 or more hydroxyl groups include sorbitol and polyglycerin. The aliphatic alcohols having 4 hydroxyl groups and the aliphatic alcohols having 6 or more hydroxyl groups may be used alone or in combination of two or more.

Examples of commercially available products of the bisphenol A epoxy resin having 2 or more hydroxyl groups and 2 epoxy groups include "jER (registered trademark)" 1004, "jER (registered trademark)" 1004AF, "jER (registered trademark)" 1007, and "jER (registered trademark)" 1009 (all manufactured by Mitsubishi Chemical Corporation).

Examples of commercially available products of the bisphenol F epoxy resin having 2 or more hydroxyl groups and 2 epoxy groups include "jER (registered trademark)" 4004P, "jER (registered trademark)" 4007P, and "jER (registered trademark)" 4009P (all manufactured by Mitsubishi Chemical Corporation), and "Epotohto (registered trademark)" YDF 2004 (manufactured by NIPPON STEEL & SUMIKIN CHEMICAL CO., LTD.).

Examples of commercially available products containing the component (D) made from pentaerythritol include "DENACOL (registered trademark)" EX-411 (manufactured by Nagase ChemteX Corporation).

Examples of commercially available products containing the component (D) made from sorbitol include "DENACOL (registered trademark)" EX-612 (manufactured by Nagase ChemteX Corporation), "DENACOL (registered trademark)" EX-614 (manufactured by Nagase ChemteX Corporation), "DENACOL (registered trademark)" EX-614B (manufactured by Nagase ChemteX Corporation), and SR-SEP (manufactured by Sakamoto Yakuhin Kogyo Co., Ltd.).

Examples of commercially available products containing the component (D) made from polyglycerin include "DENACOL (registered trademark)" EX-512 (manufactured by Nagase ChemteX Corporation), "DENACOL (registered trademark)" EX-521 (manufactured by Nagase ChemteX Corporation), SR-4GL (manufactured by Sakamoto Yakuhin Kogyo Co., Ltd.), and SR-6GL (manufactured by Sakamoto Yakuhin Kogyo Co., Ltd.).

The component (D) is preferably an aliphatic epoxy resin from the viewpoint of impregnating properties into the reinforcing fiber.

The total carbon number in the molecule of the epoxy resin as the component (D) is preferably 20 or more and 50 or less, and more preferably 20 or more and 40 or less. When the total carbon number is 20 or more, the epoxy resin composition is likely to be thickened sufficiently. In addition, when the total carbon number is 50 or less, the epoxy resin composition is impregnated into the reinforcing fiber more smoothly.

When the epoxy resin composition contains the component (D), it is preferable that the epoxy resin composition satisfy:

$$0.1 \leq D/B \leq 2$$

wherein D is parts by mass of the component (D).

The value of D/B, that is, the ratio (mass ratio) between the component (B) and the component (D) more preferably satisfies $0.125 \leq D/B \leq 1$. When the value of D/B is 0.1 or more, the epoxy resin composition is likely to be thickened sufficiently. In addition, when the value of D/B is 2 or less, the epoxy resin composition is impregnated into the reinforcing fiber more smoothly.

The epoxy resin composition may further contain an epoxy resin that does not correspond to any of the components (A), (B), and (D). Such epoxy resin is not particularly limited as long as it is a compound that contains 1 or more epoxy groups in a molecule and does not correspond to any of the components (A), (B), and (D). Specific examples of the epoxy resin include, as for an epoxy resin having 2 epoxy groups, a bisphenol A epoxy resin, a bisphenol F epoxy resin, a biphenyl epoxy resin, a dicyclopentadiene epoxy resin, and epoxy resins obtained by modifying the above-mentioned resins. Examples of an epoxy resin having 3 or more epoxy groups include a phenol novolac epoxy resin, a cresol epoxy resin, glycidyl amine epoxy resins such as tetraglycidyl diaminodiphenylmethane, triglycidyl aminophenol, and tetraglycidylamine, glycidyl ether epoxy resins such as tetrakis(glycidyloxyphenyl)ethane and tris(glycidyloxymethane), epoxy resins obtained by modifying the above-mentioned resins, and brominated epoxy resins obtained by brominating the above-mentioned epoxy resins, but are not limited thereto. Further, two or more of these epoxy resins may be used in combination. Among them, a bisphenol A epoxy resin, a bisphenol F epoxy resin, a bisphenol S epoxy resin, a phenol novolac epoxy resin, and a cresol novolac epoxy resin are particularly preferably used. Use of the above-mentioned epoxy resins exerts an additional effect that a fiber-reinforced composite material containing the epoxy resin has improved mechanical strength compared to when an epoxy resin having high rigidity such as an epoxy resin having a naphthalene group in a molecule is used. We believe that this is because an epoxy resin having high rigidity is likely to be strained because the epoxy resin comes to have an increased cross-linking density when being cured in a short time, whereas the above-mentioned epoxy resin is unlikely to cause such a problem.

Examples of commercially available products of the bisphenol A epoxy resin include "jER (registered trademark)" 825, "jER (registered trademark)" 826, "jER (registered trademark)" 827, "jER (registered trademark)" 828, "jER (registered trademark)" 834, "jER (registered trademark)" 1001, "jER (registered trademark)" 1002, "jER (registered trademark)" 1003, "EPICLON (registered trademark)" 850 (manufactured by DIC Corporation), "Epotohto (registered trademark)" YD-128 (manufactured by NIPPON STEEL & SUMIKIN CHEMICAL CO., LTD.), and "DER (registered trademark)"-331.

Examples of commercially available products of the bisphenol F epoxy resin include "jER (registered trademark)" 806, "jER (registered trademark)" 807, "jER (registered trademark)" 1750, "EPICLON (registered trademark)" 830 (manufactured by DIC Corporation), "Epotohto (registered trademark)" YDF-170, and "Epotohto (registered trademark)" YDF 2001. Examples of commercially available products of a tetramethyl bisphenol F epoxy resin, which is an alkyl-substituted derivative, include "Epotohto (registered trademark)" YSLV-80Y/X (NIPPON STEEL & SUMIKIN CHEMICAL CO., LTD.).

Examples of the bisphenol S epoxy resin include "EPICLON (registered trademark)" EXA-1515 (manufactured by DIC Corporation).

Examples of commercially available products of the phenol novolac epoxy resin include "jER (registered trademark)" 152 and "jER (registered trademark)" 154 (both manufactured by Mitsubishi Chemical Corporation), and "EPICLON (registered trademark)" N740, "EPICLON (registered trademark)" N-770, and "EPICLON (registered trademark)" N-775 (all manufactured by DIC Corporation).

Examples of commercially available products of the cresol novolac epoxy resin include "EPICLON (registered trademark)" N-660, "EPICLON (registered trademark)" N-665, "EPICLON (registered trademark)" N-670, "EPICLON (registered trademark)" N-673, and "EPICLON (registered trademark)" N-695 (all manufactured by DIC Corporation), and EOCN1020, EOCN-1025, and EOCN-1045 (all manufactured by Nippon Kayaku Co., Ltd.).

The epoxy resin composition may contain a known epoxy hardener. The epoxy hardener is not particularly limited as long as it is capable of curing the epoxy resin. Examples of the epoxy hardener include amine-based, phenol-based, acid anhydride-based, and mercaptan-based hardeners, imidazole type hardeners, tertiary amines, organophosphorus compounds, urea compounds, ammonium salts, and sulfonium salts. Examples of the amine-based hardener include dicyandiamide, aromatic polyamines, aliphatic amines, amino benzoic acid ester type hardeners, thiourea added amines, and hydrazides. Examples of the phenol-based hardener include bisphenols, phenol novolac resins, cresol novolac resins, and polyphenols. Examples of the acid anhydride-based hardener include phthalic anhydride, maleic anhydride, succinic anhydride, and carboxylic acid anhydride. Examples of the mercaptan-based hardener include polymercaptan and polysulfide resins. Among the above-mentioned hardeners, amine-based hardeners are preferable. Further, among them, dicyandiamide or a derivative thereof is particularly preferable. Dicyandiamide is excellent in that it easily imparts high mechanical properties and heat resistance to a cured resin, and is widely used as a hardener for epoxy resins. Moreover, dicyandiamide is preferably used since it exhibits excellent preservation stability of the epoxy resin composition. Further, the "derivative of dicyandiamide" means a compound obtained by bonding dicyandiamide with some kind of compound. Similarly to dicyandiamide, the derivative of dicyandiamide is excellent in that it easily imparts high mechanical properties and heat resistance to a cured resin, and also exhibits excellent preservation stability of the epoxy resin composition. Examples of the derivative of dicyandiamide include those obtained by bonding dicyandiamide with some kind of compound such as an epoxy resin, a vinyl compound, an acrylic compound, or 9,10-dihydro-9-oxa-10-phosphaphenanthrene-10-oxide. These derivatives may be used alone or in combination of two or more. In addition, the derivatives may also be used in combination with dicyandiamide. Examples of commercially available products of dicyandiamide include DICY7 and DICY15 (both manufactured by Mitsubishi Chemical Corporation).

When the epoxy resin composition contains the epoxy hardener, the content of the epoxy hardener is preferably 1 part by mass or more and 50 parts by mass or less, and more preferably 6 parts by mass or more and 50 parts by mass or less based on 100 parts by mass in total of the epoxy resin in the epoxy resin composition. When the content of the epoxy hardener is 1 part by mass or more, a sufficient effect of improving the curability is likely to be obtained. In addition, when the content of the epoxy hardener is 50 parts by mass or less, the cured resin obtained by curing the epoxy resin composition is likely to have higher heat resistance.

The epoxy resin composition preferably has a viscosity at 30° C. measured by an E-type viscometer of 0.01 Pa·s or more and 5 Pa·s or less. The viscosity is more preferably 0.01 Pa·s or more and 2 Pa·s or less, and still more preferably 0.01 Pa·s or more and 1.5 Pa·s or less. An epoxy resin composition having a viscosity at 30° C. of 0.01 Pa·s or more is likely to have excellent impregnating properties into the reinforcing fiber. Further, an epoxy resin composition having a viscosity at 30° C. of 5 Pa·s or less will not have too low a viscosity at the time of impregnating into the reinforcing fiber, will not flow to the outside, and is likely to uniformly impregnate into the reinforcing fiber. The viscosity is determined by subjecting the epoxy resin composition, which is obtained after mixing the components and stirring the components for 1 minute, to the measurement.

The heat resistance of the fiber-reinforced composite material containing the epoxy resin composition depends on the glass transition temperature (Tg) of the cured resin obtained by curing the epoxy resin composition. To obtain a fiber-reinforced composite material having high heat resistance, it is preferable that the cured resin, which is obtained by heating the epoxy resin composition at a temperature of 140° C. for 2 hours to fully cure, have a glass transition temperature of 120° C. or more. The upper limit of the glass transition temperature is not particularly limited, but is preferably 250° C. or less. It is more preferable that the glass transition temperature be 130° C. or more and 220° C. or less. When the glass transition temperature is 120° C. or more, high heat resistance is likely to be imparted to the cured resin obtained by curing the epoxy resin composition. When the glass transition temperature is 250° C. or less, a three-dimensional crosslinked structure of the cured resin obtained by curing the epoxy resin composition will not have too high a cross-linking density, and high mechanical properties are likely to be exhibited. Herein, the glass transition temperature of the cured epoxy resin obtained by curing the epoxy resin composition is determined by measurement using a dynamic mechanical analyzer (DMA). Specifically, DMA measurement is performed at elevated temperature using a rectangular test piece cut out from a cured resin plate, and the temperature at the inflection point of the obtained storage modulus G' is defined as Tg. The measurement conditions are as described in the EXAMPLES.

The mechanical properties of the fiber-reinforced composite material containing the epoxy resin composition depend on the mechanical properties of the cured resin obtained by curing the epoxy resin composition. To obtain a fiber-reinforced composite material having high mechanical properties, it is preferable that the cured product, which is obtained by heating the epoxy resin composition at a temperature of 140° C. for 2 hours to fully cure, have a bending strength of 110 MPa or more, and the bending strength is more preferably 120 MPa or more. When the bending strength of the cured resin is 110 MPa or more, the fiber-reinforced composite material containing the epoxy resin composition is usable as an excellent member that will not easily break or deform even if the fiber-reinforced composite material is placed in an environment where it receives strong external stress.

The molding material for a fiber-reinforced composite material contains the epoxy resin composition and a reinforcing fiber. In the molding material for a fiber-reinforced composite material, the type and length of the reinforcing fiber, the content ratio between the reinforcing fiber and the resin, and the like are not particularly limited.

As for the form of the reinforcing fiber, when a continuous reinforcing fiber is used, examples of the fiber form include fiber structures such as long fibers arranged in one direction, single tows, woven fabrics, knits, nonwoven fabrics, mats, and braids. Fiber structures having an average fiber diameter of 3 μm or more and 12 μm or less and a weight content of the reinforcing fiber of 40% or less and 90% or less are preferably used. When the mass fraction of the carbon fiber is 40% or more, the obtained fiber-reinforced composite material will not have too large a mass, and the advantages of the fiber-reinforced composite material such as excellent specific strength and excellent specific elastic modulus are likely to be fully exhibited. In addition, when the mass fraction of the carbon fiber is 90% or less, the epoxy resin composition is more excellent in impregnating properties into the reinforcing fiber. Examples of the fiber-reinforced composite material obtained by using such continuous fiber include prepregs and tow prepregs.

As for the form of the reinforcing fiber, when a discontinuous reinforcing fiber is used, fiber structures having a fiber length of the reinforcing fiber of 5 μm or more and 100 mm or less, an average fiber diameter of 3 μm or more and 12 μm or less, and a weight content of the reinforcing fiber of 40% or more and 90% or less are preferably used. When the mass fraction of the carbon fiber is 40% or more, the obtained fiber-reinforced composite material will not have too large a mass, and the advantages of the fiber-reinforced composite material such as excellent specific strength and excellent specific elastic modulus are likely to be fully exhibited. In addition, when the mass fraction of the carbon fiber is 90% or less, the epoxy resin composition is more excellent in impregnating properties into the reinforcing fiber. Examples of the molding material for a fiber-reinforced composite material obtained by using such discontinuous fiber include BMCs and SMCs. Among them, SMCs are particularly preferably used from the viewpoint of productivity and the degree of freedom of the shape of the molding.

The form of a bundle assembly of such discontinuous fiber is not particularly limited, and a known technique can be applied. As for the bundle assembly, it is preferable that in a plane of the bundle assembly in which the width of the bundle assembly in the direction perpendicular to the filament arrangement direction of the reinforcing fiber is the largest, angles a and b, which are the degrees of acute angles made by the sides formed by arrayed both ends of the reinforcing fiber filaments in the bundle assembly, are each 2° or more and 30° or less. The smaller the angles a and b, which are the degrees of angles made by the sides formed by arrayed both ends of the reinforcing fiber filaments in the bundle assembly to the arrangement direction of the reinforcing fiber filaments are, the higher the homogeneity of the bundle assembly and the resin in the SMC is. Therefore, a great effect of improving the surface quality and strength is exerted on a fiber-reinforced composite material formed using the SMC. The effect is remarkable when the angles a and b are each 30° or less. Meanwhile, the smaller the angles a and b are, the lower the handleability of the bundle assembly itself is. Further, the smaller the angle between the arrangement direction of the reinforcing fiber filaments and the cutting blade is, the lower the stability in the cutting step is. Therefore, the angles a and b are preferably each 2° or more. It is more preferable that the angles a and b be each 3° or more and 25° or less. It is still more preferable that the angles a and b be each 5° or more and 15° or less in view of the balance between the effect of improving the surface quality and strength of the fiber-reinforced composite material and the processability in the production process of the bundle assembly. As described above, the "degrees of angles" referred to herein are the degrees of the angles shown in the Drawing and are each represented by an absolute value.

Examples of a cutter that cuts the continuous reinforcing fiber bundle to produce a bundle assembly of discontinuous reinforcing fiber filaments include rotary cutters such as a guillotine cutter and a roving cutter. The continuous reinforcing fiber bundle is inserted into the cutter and cut in a state where the longitudinal direction of the continuous reinforcing fiber bundle and the direction of the cutting blade equipped in the cutter are relatively oblique.

The method of producing a molding material for a fiber-reinforced composite material is not particularly limited. For example, the molding material for a fiber-reinforced composite material may be obtained by the following method. Specifically, the epoxy resin composition is impregnated into the reinforcing fiber by a well-known method suitable for the form of the reinforcing fiber, and then the resulting product is held at a temperature of about room temperature to about 80° C. for several hours to several days to bring the epoxy resin composition into a semi-cured state where the increase in viscosity of the epoxy resin composition is saturated. Herein, bringing the epoxy resin composition into a semi-cured state where the increase in viscosity of the epoxy resin composition is saturated is referred to as bringing the epoxy resin composition into the B-stage. The conditions to bring the epoxy resin composition into the B-stage can be arbitrarily set at a temperature of about room temperature to about 80° C. and a period of several hours to several days. In the evaluation, the conditions employed to bring the epoxy resin composition into the B-stage are conditions in which the epoxy resin composition is held at 40° C. for 24 hours to saturate the increase in viscosity of the resin composition and bring the resin composition into a semi-cured state.

In the molding material for a fiber-reinforced composite material, the epoxy resin composition is believed to be brought into the B-stage mainly due to the reaction between the polyisocyanate compound and the hydroxyl group in the epoxy resin.

As for the viscosity of the epoxy resin composition after being brought into the B-stage, it is preferable that the viscosity at the molding temperature, for example, the viscosity at 30° C. measured using a DMA (for example, ARES manufactured by TA Instruments) be 1,000 Pa·s or more and 500,000 Pa·s or less. The viscosity is more preferably 1,000 Pa·s or more and 50,000 Pa·s or less. When the viscosity of the epoxy resin composition is 1,000 Pa·s or more, the resin has a slightly high viscosity and is not so sticky so that films attached to both surfaces of the molding material for a fiber-reinforced composite material are easy to peel off, and the molding material is likely to be satisfactory in handleability. When the viscosity of the epoxy resin composition is 500,000 Pa·s or less, the molding material for a fiber-reinforced composite material containing the epoxy resin composition will not lose the flexibility, is easily unwound from a roll shape during the storage, and likely to have satisfactory shapability in the mold.

It is preferable that the variation in viscosity of the epoxy resin composition after being brought into the B-stage due to the temperature rise be small and satisfy:

$$0.002 \leq Y/X \leq 1$$

wherein X is the viscosity at 30° C., and Y is the viscosity at 120° C.

The value of Y/X is more preferably $0.01 \leq Y/X \leq 1$. The value of Y/X is still more preferably $0.05 \leq Y/X \leq 1$. When the value of Y/X is 0.002 or more, during press forming of the molding material for a fiber-reinforced composite material containing the epoxy resin composition, the molding material is likely to exhibit excellent flowability regardless of the molding temperature. When the value of Y/X is 1 or less, the molding material for a fiber-reinforced composite material containing the epoxy resin composition is likely to be sufficiently soft, and is easy to mold in press forming even if the molding material has a complicated shape.

The reinforcing fiber used in the molding material for a fiber-reinforced composite material and the fiber-reinforced composite material is not particularly limited, and examples of the reinforcing fiber include a glass fiber, a carbon fiber, a graphite fiber, an aramid fiber, a boron fiber, an alumina fiber, and a silicon carbide fiber. Although a mixture of two or more of the above-mentioned reinforcing fibers may be used, it is preferable to use a carbon fiber or a graphite fiber to provide a molded article that is lighter and has higher durability. In particular, in applications in which weight reduction and high strength of the material are highly demanded, a carbon fiber is preferably used because of excellent specific elastic modulus and specific strength. The carbon fiber used may be of any type suitable for the application, but the carbon fiber is preferably a fiber having a tensile modulus of at most 400 GPa from the viewpoint of impact resistance. Further, from the viewpoint of strength, a carbon fiber having a tensile strength of 4.4 to 6.5 GPa is preferably used since such carbon fiber provides a composite material having high stiffness and mechanical strength. In addition, the tensile elongation is also an important factor, and it is preferable that the carbon fiber be a high-strength high-elongation carbon fiber having a tensile elongation of 1.7 to 2.3%. Therefore, a carbon fiber having all the characteristics including a tensile modulus of at least 230 GPa, a tensile strength of at least 4.4 GPa, and a tensile elongation of at least 1.7% is most suitable.

Examples of commercially available products of the carbon fiber include "torayca (registered trademark)" T800G-24K, "torayca (registered trademark)" T800S-24K, "torayca (registered trademark)" T700G-24K, "torayca (registered trademark)" T300-3K, and "torayca (registered trademark)" T700S-12K (all manufactured by TORAY INDUSTRIES, INC.).

The reinforcing fiber may have either a continuous or discontinuous form. When a member having a complicated shape is produced, it is preferable to use a discontinuous fiber from the viewpoint of flowability. In this example, the discontinuous fiber is more preferably a chopped reinforcing fiber bundle made of short fibers. The length of the short fibers is preferably 0.3 to 10 cm, and more preferably 1 to 5 cm. When the length of the short fibers is 0.3 cm or more, a fiber-reinforced composite material having satisfactory mechanical properties is likely to be obtained. When the length of the short fibers is 10 cm or less, a molding material for a fiber-reinforced composite material having satisfactory flowability during press forming is likely to be obtained.

The method of producing a fiber-reinforced composite material containing the epoxy resin composition is not particularly limited, but a hand lay-up method, a filament winding method, a pultrusion method, a resin transfer molding (RTM) method, an autoclave molding method of a prepreg, and further, press forming methods of molding materials for a fiber-reinforced composite material such as prepregs and tow prepregs, bulk molding compounds (BMCs), and sheet molding compounds (SMCs) are preferably used.

The fiber-reinforced composite material contains a cured resin of the epoxy resin composition and a reinforcing fiber. As for the fiber-reinforced composite material, particularly in a fiber-reinforced composite material used in the field of automobiles, mechanical properties such as high heat resistance and bending strength are required. The fiber-reinforced composite material is preferably used also in the field of automobiles since the fiber-reinforced composite material is excellent in heat resistance and mechanical properties. Further, the molding material for a fiber-reinforced composite material provides a fiber-reinforced composite material in which the fiber and the resin have very high homogeneity, because the resin does not singly flow first during press forming, and the molding material exhibits excellent flowability regardless of the molding temperature.

EXAMPLES

Hereinafter, our epoxy resin compositions, molding materials for a fiber-reinforced composite material, and fiber-reinforced composite materials will be described in more detail with reference to examples.

Resin Raw Materials

The following resin raw materials were used to obtain the epoxy resin compositions of the examples and comparative examples. The numerical value of each component in the column of "Epoxy resin composition" in the tables indicates the content, and the unit ("parts") is "parts by mass" unless otherwise specified.

1. Component (A): Aliphatic epoxy resin having 1 hydroxyl group and 2 or more and 3 or less epoxy groups in a molecule Diglycidyl ether containing glycerol skeleton (number of hydroxyl groups: 1, number of epoxy groups: 2)

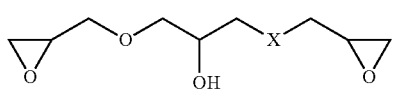

(3)

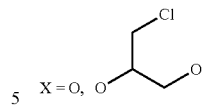

X = O,

Diglycidyl ether containing trimethylolpropane skeleton (number of hydroxyl groups: 1, number of epoxy groups: 2)

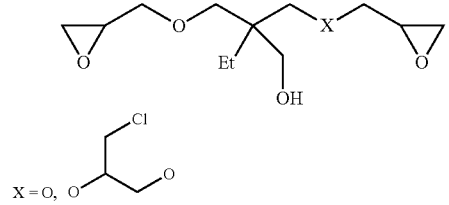

(4)

Triglycidyl ether containing diglycerol skeleton (number of hydroxyl groups: 1, number of epoxy groups: 3)

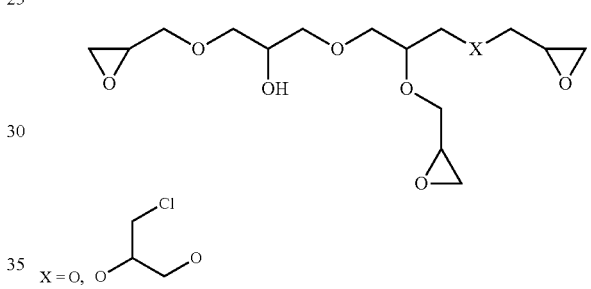

(5)

2. Component (B): Aliphatic epoxy resin having 0 hydroxyl groups and 3 epoxy groups in a molecule Triglycidyl ether containing glycerol skeleton (number of hydroxyl groups: 0, number of epoxy groups: 3)

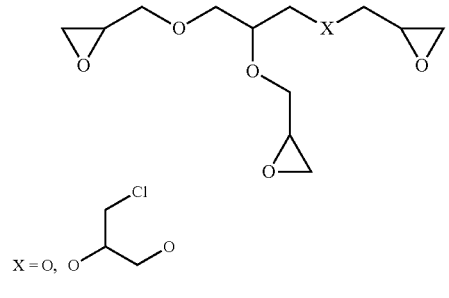

(6)

Triglycidyl ether containing trimethylolpropane skeleton (hydroxyl group: 0, number of epoxy groups: 3)

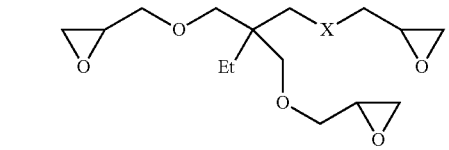

(7)

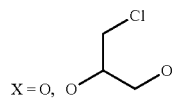

3. Component (C): Polyisocyanate compound
"Lupranate (registered trademark)" M20S (manufactured by BASF INOAC Polyurethanes Ltd.): Polymeric MDI (polymethylene polyphenyl polyisocyanate)
"Lupranate (registered trademark)" MI (manufactured by BASF INOAC Polyurethanes Ltd.): Monomeric MDI (diphenylmethane diisocyanate) HDI (manufactured by Tokyo Chemical Industry Co., Ltd.): HDI (hexamethylene diisocyanate)

4. Component (D): Epoxy resin having 2 or more hydroxyl groups and 2 or more epoxy groups in a molecule "jER (registered trademark)" 1007 (manufactured by Mitsubishi Chemical Corporation)

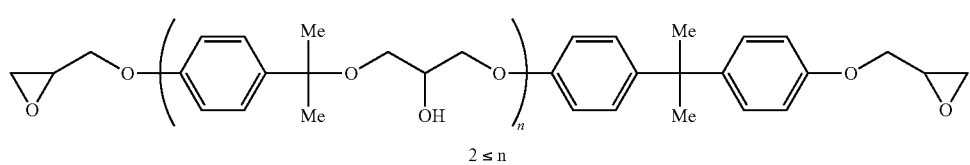

(8)

$2 \leq n$

"DENACOL (registered trademark)" EX-614 (manufactured by Nagase ChemteX Corporation): including compounds (X), (Y), and (Z)

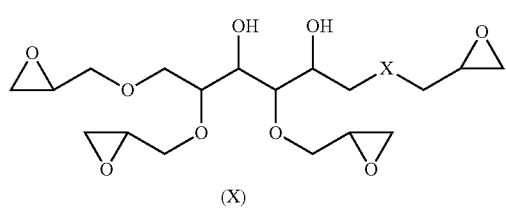

(X)

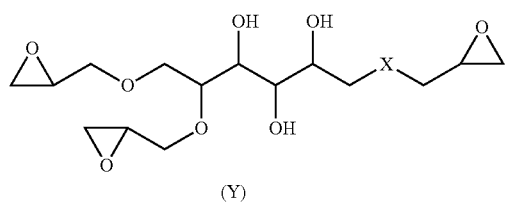

(Y)

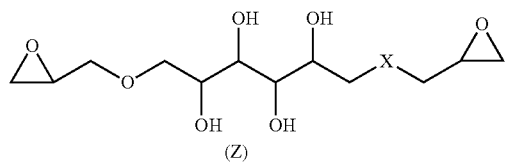

(Z)

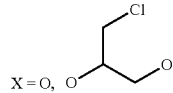

SR-6GL (manufactured by Sakamoto Yakuhin Kogyo Co., Ltd.)

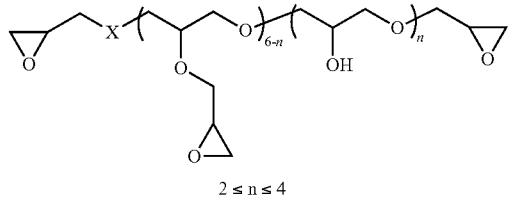

(10)

$2 \leq n \leq 4$

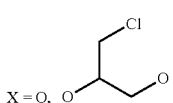

5. Other epoxy resins
"Epotohto (registered trademark)" YD 128 (manufactured by NIPPON STEEL & SUMIKIN CHEMICAL CO., LTD.): Liquid bisphenol A epoxy resin
"YDF (registered trademark) 170" (manufactured by NIPPON STEEL & SUMIKIN CHEMICAL CO., LTD.): Solid bisphenol F epoxy resin
"DENACOL (registered trademark)" EX-212 (manufactured by Nagase ChemteX Corporation): 1,6-Hexanediol diglycidyl ether 6. Epoxy hardener
"jERcure (registered trademark)" DICY7 (manufactured by Mitsubishi Chemical Corporation): Dicyandiamide
Preparation of Epoxy Resin Compositions
Epoxy resin compositions were prepared by mixing the components at the content ratios shown in the tables.
Ratio of Each Component in Epoxy Resins
A THF (tetrahydrofuran, manufactured by FUJIFILM Wako Pure Chemical Corporation, grade: special grade reagent) solution of a specimen to be measured was prepared so that the concentration of the specimen might be 0.5% by mass. The obtained THF solution of the specimen was injected into a GPC (gel permeation chromatograph) for measurement. The measurement conditions and the apparatus of the GPC were as follows. That is, the above-mentioned THF was used as the mobile phase, and TSKgel (registered trademark) G1000H$_{XL}$, (manufactured by Tosoh Corporation) and TSKgel (registered trademark) G2000H$_{XL}$, (manufactured by Tosoh Corporation) were used under the conditions of a temperature of 40° C. and a pressure of 60 kg/cm$^2$. An RI (refractive index detector) was used as the detector. The ratio of each component was calculated from the area ratio in the molecular weight distribution obtained by the measurement. The ratio was calculated assuming that compounds with an area rate of 5% or less were not contained.

Measurement of Viscosity of Epoxy Resin Compositions Immediately after Preparation The specimen to be measured, while being held at 70° C., was subjected to the measurement according to JIS Z8803 (1991), "Viscosity measurement method using circular cone-flat plate type rotary viscometer" using an E-type viscometer equipped with a standard cone rotor (1° 34'× R24). The E-type viscometer used was TVE-30H manufactured by TOKIMEC INC. The specimen used was an epoxy resin composition obtained immediately after mixing the components.

Measurement of Viscosity of Epoxy Resin Compositions after being Brought into B-Stage Using a DMA (ARES manufactured by TA Instruments), the specimen to be measured was placed on a stage heated to 30° C., and the viscosity of the sample when the temperature was raised by 10° C. per minute was measured. The viscosity at each temperature was defined as the viscosity under the temperature condition. For example, the viscosity when the specimen reached 30° C. was defined as the viscosity at 30° C. The specimen used was an epoxy resin composition obtained by mixing the components and held at 40° C. for 24 hours. Similarly, the viscosity when the specimen reached 120° C. was defined as the viscosity at 120° C. The specimen used was an epoxy resin composition obtained by mixing the components and held at 40° C. for 24 hours.

Production of Cured Resins

Each epoxy resin composition prepared in the Preparation of epoxy resin compositions section was defoamed in a vacuum, and then injected into a mold set to a thickness of 2 mm with a 2-mm thick "TEFLON (registered trademark)" spacer. The epoxy resin composition was cured at a temperature of 140° C. for 2 hours to give a cured resin having a thickness of 2 mm.

Measurement of Glass Transition Temperature Tg of Cured Resins

From each cured resin obtained in the Production of cured resins section, a test piece having a width of 12.7 mm and a length of 40 mm was cut out, and the test piece was subjected to Tg measurement using a DMA (ARES manufactured by TA Instruments). The measurement condition was a temperature ramp rate of 5° C./min. The temperature at the inflection point of the storage modulus G' obtained in the measurement was defined as Tg.

Measurement of Bending Strength of Cured Products

From each cured resin obtained in the Production of cured products section, a test piece having a width of 15 mm and a length of 100 mm was cut out. Using an Instron universal tester (manufactured by Instron), the bending strength of the cut test piece was measured by a 3-point bending test according to JIS K7074:1988. The measurement was performed under the conditions of a crosshead speed of 5 mm/min, a span of 80 mm, an indenter diameter of 5 mm, and a fulcrum diameter of 2 mm. Five test pieces were subjected to the measurement, and the average was taken as the bending strength of the cured product.

Production of Molding Materials for Fiber-Reinforced Composite Material

The carbon fiber used was "torayca (registered trademark)" T700S-12K (manufactured by TORAY INDUSTRIES, INC.). The continuous carbon fiber strands were cut and scattered to be uniformly dispersed to produce a discontinuous carbon fiber nonwoven fabric having an isotropic fiber orientation. The cutting device used was a rotary cutter. The distance between the blades was 30 mm. The discontinuous carbon fiber nonwoven fabric had a basis weight of 1 kg/m².

The discontinuous carbon fiber nonwoven fabric was impregnated with the epoxy resin composition using a roller so that the weight content of the carbon fiber in the molding material for a fiber-reinforced composite material might be 40% to give a sheet-shaped molding material for a fiber-reinforced composite material. The obtained molding material for a fiber-reinforced composite material had a basis weight of 2 kg/m².

Evaluation of Tackiness Properties of Molding Materials for Fiber-Reinforced Composite Material The tackiness properties of each molding material for a fiber-reinforced composite material produced in the Production of molding materials for fiber-reinforced composite material section were evaluated as follows. A film was attached to a surface of the molding material for a fiber-reinforced composite material cut into a length of 15 cm and a width of 15 cm, and the resulting laminate was pressurized using a press at a temperature of 25° C. and a pressure of 20 kN for 1 minute. The weight increment of the film peeled off from the obtained molding material for a fiber-reinforced composite material was measured.

C: 5 g or more, B: 5 to 2 g, A: 2 g or less

Evaluation of Rate of Flow of Molding Materials for Fiber-Reinforced Composite Material Each molding material for a fiber-reinforced composite material produced in the Production of molding materials for fiber-reinforced composite material section was cut into a length of 5 cm and a width of 5 cm, and two-ply laminated to produce a sample. The obtained sample was heated using a press at a mold temperature of 140° C. and a pressure of 20 kN for 5 minutes. Then, the area of the molded article containing the resin and the reinforcing fiber was measured and divided by the area before press forming, and the resulting value was multiplied by 100 to calculate the rate of flow.

C: 100 to 110%, B: 111 to 200%, A: 201 to 300%, S: 301 to 700%

Example 1

An epoxy resin composition was prepared by adding 30 parts of EX-313 and 30 parts of EX-314 so that the amounts of the components (A) and (B) blended might satisfy the content ratio as shown in Table 1-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 1-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of $0.002 \leq Y/X \leq 1$. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 2

An epoxy resin composition was prepared by adding 20 parts of EX-313, 20 parts of EX-314, and 20 parts of SR-TMP so that the amounts of the components (A) and (B) blended might satisfy the content ratio as shown in Table 1-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 1-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of $0.002 \leq Y/X \leq 1$. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 3

An epoxy resin composition was prepared by adding 40 parts of SR-DGE and 30 parts of SR-TMP so that the amounts of the components (A) and (B) blended might satisfy the content ratio as shown in Table 1-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 1-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pas or less. Moreover, the variation in viscosity of the epoxy resin composition due to the temperature rise was small, and satisfied the above-mentioned condition of $0.002 \leq Y/X \leq 1$. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 4

An epoxy resin composition was prepared by adding 66 parts of SR-TMP so that the amounts of the components (A) and (B) blended might satisfy the content ratio as shown in Table 1-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 1-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of $0.002 \leq Y/X \leq 1$. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 5

An epoxy resin composition was prepared by adding 10 parts of EX-313, 10 parts of EX-314, and 10 parts of SR-TMP so that the amounts of the components (A) and (B) blended might satisfy the content ratio as shown in Table 1-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 1-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of $0.002 \leq Y/X \leq 1$. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 6

An epoxy resin composition was prepared by adding 20 parts of EX-313, 20 parts of EX-314, and 10 parts of SR-TMP so that the amounts of the components (A) and (B) blended might satisfy the content ratio as shown in Table 1-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 1-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 7

An epoxy resin composition was prepared by adding 15 parts of EX-313, 15 parts of EX-314, and 40 parts of SR-DGE so that the amounts of the components (A) and (B) blended might satisfy the content ratio as shown in Table 2-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 2-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 8

An epoxy resin composition was prepared by adding 25 parts of EX-313, 25 parts of EX-314, and 40 parts of SR-DGE so that the amounts of the components (A) and (B) blended might satisfy the content ratio as shown in Table 2-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 2-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 9

An epoxy resin composition was prepared by adding 60 parts of SR-TMP so that the amounts of the components (A) and (B) blended might satisfy the content ratio as shown in Table 2-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 2-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 10

An epoxy resin composition was prepared by adding 20 parts of EX-313, 20 parts of EX-314, 20 parts of SR-TMP, and 5 parts of jER 1007 so that the amounts of the components (A), (B), and (D) blended might satisfy the content ratio as shown in Table 2-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 2-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 11

An epoxy resin composition was prepared by adding 20 parts of EX-313, 20 parts of EX-314, 20 parts of SR-TMP, and 5 parts of EX-614 so that the amounts of the components (A), (B), and (D) blended might satisfy the content ratio as shown in Table 2-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 2-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 12

An epoxy resin composition was prepared by adding 20 parts of EX-313, 20 parts of EX-314, 20 parts of SR-TMP, and 5 parts of SR-6GL so that the amounts of the components (A), (B), and (D) blended might satisfy the content ratio as shown in Table 2-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 2-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 13

An epoxy resin composition was prepared by adding 20 parts of EX-313, 20 parts of EX-314, 20 parts of SR-TMP, and 15 parts of SR-6GL so that the amounts of the components (A), (B), and (D) blended might satisfy the content ratio as shown in Table 3-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 3-2, the epoxy resin composition immediately after preparation had a viscosity at 30° C. of 5 Pa·s or less. Further, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 14

An epoxy resin composition was prepared by adding 10 parts of EX-313, 10 parts of EX-314, 15 parts of SR-TMP, and 25 parts of SR-6GL so that the amounts of the components (A), (B), and (D) blended might satisfy the content ratio as shown in Table 3-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 3-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 15

An epoxy resin composition was prepared by adding 20 parts of EX-313, 20 parts of EX-314, 20 parts of SR-TMP, and 5 parts of SR-6GL so that the amounts of the components (A), (B), and (D) blended might satisfy the content ratio as shown in Table 3-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 3-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 16

An epoxy resin composition was prepared by adding 20 parts of EX-313, 20 parts of EX-314, 20 parts of SR-TMP, and 5 parts of SR-6GL so that the amounts of the components (A), (B), and (D) blended might satisfy the content ratio as shown in Table 3-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 3-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 17

An epoxy resin composition was prepared by adding 20 parts of EX-313, 20 parts of EX-314, 20 parts of SR-TMP, and 5 parts of SR-6GL so that the amounts of the components (A), (B), and (D) blended might satisfy the content ratio as shown in Table 3-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 3-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 18

An epoxy resin composition was prepared by adding 20 parts of EX-313, 20 parts of EX-314, 12 parts of SR-TMP, and 5 parts of SR-6GL so that the amounts of the components (A), (B), and (D) blended might satisfy the content ratio as shown in Table 4-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 4-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 19

An epoxy resin composition was prepared by adding 66 parts of SR-TMP and 10 parts of SR-6GL so that the amounts of the components (A), (B), and (D) blended might satisfy the content ratio as shown in Table 4-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 4-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 20

An epoxy resin composition was prepared by adding 15 parts of EX-313, 15 parts of EX-314, 33 parts of SR-TMP, and 25 parts of SR-6GL so that the amounts of the components (A), (B), and (D) blended might satisfy the content ratio as shown in Table 4-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 4-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 21

An epoxy resin composition was prepared by adding 33 parts of SR-TMP and 40 parts of SR-6GL so that the amounts of the components (A), (B), and (D) blended might satisfy the content ratio as shown in Table 4-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 4-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Example 22

An epoxy resin composition was prepared by adding 40 parts of SR-TMP and 30 parts of SR-6GL so that the amounts of the components (A), (B), and (D) blended might satisfy the content ratio as shown in Table 4-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 4-2, the epoxy resin composition immediately after preparation had a viscosity at 30° C. of 5 Pa·s or less. In addition, the epoxy resin composition after being brought into the B-stage had a viscosity at 30° C. of 1,000 Pa·s or more and 500,000 Pa·s or less. Moreover, the variation in viscosity of the epoxy resin composition due to the temperature rise was small, and satisfied the above-mentioned condition of 0.002≤Y/X≤1. Further, the cured resin obtained by curing the epoxy resin composition had a Tg of 120° C. or more and a bending strength of 110 MPa or more. Moreover, the molding material for a fiber-reinforced composite material obtained using the epoxy resin composition had tackiness properties and rate of flow of both B or better.

Comparative Example 1

An epoxy resin composition was prepared by adding 45 parts of EX-313 and 45 parts of EX-314 so that the amounts of the components (A) and (B) blended might satisfy the content ratio as shown in Table 5-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 5-2, the epoxy resin composition immediately after preparation had a satisfactory viscosity at 30° C. of 0.3 Pa·s, and the epoxy resin composition after being brought into the B-stage had a viscosity at 30° C. of 2,000 Pa·s. However, the variation in viscosity of the epoxy resin composition due to the temperature rise was large and the value of Y/X was as small as 0.001, and thus the epoxy resin composition was defective. Further, the cured resin obtained by curing the epoxy resin composition had a poor Tg of 113° C., and was poor in the mechanical properties including a bending strength of 108 MPa. Moreover, the molding material for a fiber-reinforced composite material obtained using the epoxy resin composition had tackiness properties of B and a rate of flow of C.

Comparative Example 2

An epoxy resin composition was prepared by adding 30 parts of SR-DGE and 50 parts of jER 1007 so that the amounts of the components (A) and (D) blended might satisfy the content ratio as shown in Table 5-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 5-2, the epoxy resin composition immediately after preparation had a poor viscosity at 30° C. of 12.5 Pa·s. Although the epoxy resin composition after being brought into the B-stage had a poor viscosity at 30° C. of 700,000 Pa·s, the variation in viscosity of the epoxy resin composition due to the temperature rise was small and satisfactory, and the value of Y/X was 0.004. Further, the cured resin obtained by curing the epoxy resin composition had a satisfactory Tg of 122° C., but was poor in the mechanical properties including a bending strength of 103 MPa. Moreover, the molding material for a fiber-reinforced composite material obtained using the epoxy resin composition had tackiness properties of C and a rate of flow of B.

Comparative Example 3

An epoxy resin composition was prepared by adding 10 parts of EX-313, 10 parts of EX-314, and 10 parts of jER 1007 so that the amounts of the components (A), (B), and (D) blended might satisfy the content ratio as shown in Table 5-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 5-2, the epoxy resin composition immediately after preparation had a poor viscosity at 30° C. of 7.8 Pa·s. Further, the epoxy resin composition after being brought into the B-stage had a poor viscosity at 30° C. of 600,000 Pa·s. Moreover, the variation in viscosity of the epoxy resin composition due to the temperature rise was large and the value of Y/X was 0.0006, and thus the epoxy resin composition was defective. Further, the cured resin obtained by curing the epoxy resin composition had a satisfactory Tg of 120° C., but was poor in the mechanical properties including a bending strength of 104 MPa. Moreover, the molding material for a fiber-reinforced composite material obtained using the epoxy resin composition had tackiness properties of C and a rate of flow of C.

Comparative Example 4

An epoxy resin composition was prepared by adding 10 parts of EX-313, 10 parts of EX-314, and 40 parts of EX-614 so that the amounts of the components (A), (B), and (D) blended might satisfy the content ratio as shown in Table 5-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 5-2, the epoxy resin composition immediately after preparation had a poor viscosity at 30° C. of 11.5 Pa·s. Further, the epoxy resin composition after being brought into the B-stage had a poor viscosity at 30° C. of 760,000 Pa·s. The variation in viscosity of the epoxy resin composition due to the temperature rise was small and satisfactory, and the value of Y/X was 0.003. However, the cured resin obtained by curing the epoxy resin composition had a poor Tg of 117° C., and was poor in the mechanical properties including a bending strength of 103 MPa. Moreover, the molding material for a fiber-reinforced composite material obtained using the epoxy resin composition had tackiness properties of C and a rate of flow of B.

Comparative Example 5

An epoxy resin composition was prepared by adding 20 parts of SR-6GL so that the amount of the component (D) blended might satisfy the content ratio as shown in Table 5-1, and further adding the component (C) and other components at the content ratio shown in the table, and the viscosity of the epoxy resin composition at 30° C. was measured. In addition, the epoxy resin composition was held at 40° C. for 24 hours to be brought into the B-stage, and then the viscosities at 30° C. and 120° C. were measured. A cured resin of the epoxy resin composition was produced using the epoxy resin composition before being brought into the B-stage. As shown in Table 5-2, the epoxy resin composition immediately after preparation had an acceptable viscosity at 30° C. of 3.5 Pa·s. However, the epoxy resin composition after being brought into the B-stage had a poor viscosity at 30° C. of 980 Pa·s. Moreover, the variation in viscosity of the epoxy resin composition due to the temperature rise was large and the value of Y/X was 0.0001, and thus the epoxy resin composition was defective. The cured resin obtained by curing the epoxy resin composition had a poor Tg of 102° C., and was poor in the mechanical properties including a bending strength of 98 MPa. Moreover, the molding material for a fiber-reinforced composite material obtained using the epoxy resin composition had tackiness properties of C and a rate of flow of C.

TABLE 1-1

| | | | Example 1 | Example 2 | Example 3 | Example 4 | Example 5 | Example 6 |
|---|---|---|---|---|---|---|---|---|
| Epoxy resin composition | Component (A) | Diglycidyl ether containing glycerol skeleton | 30 | 20 | — | — | 10 | 20 |
| | | Diglycidyl ether containing trimethylolpropane skeleton | — | 5 | 10 | 16 | 3 | 3 |
| | | Triglycidyl ether containing diglycerol skeleton | — | — | 30 | — | — | — |
| | Component (B) | Triglycidyl ether containing glycerol skeleton | 30 | 20 | — | — | 10 | 20 |
| | | Triglycidyl ether containing trimethylolpropane skeleton | — | 15 | 20 | 50 | 7 | 7 |
| | Component (D) | 1007 | — | — | — | — | — | — |
| | | EX-614 | — | — | — | — | — | — |
| | | SR-6GL | — | — | — | — | — | — |
| | Component (C) | M20S | 28 | 28 | 28 | 28 | 28 | 28 |
| | | MI | — | — | — | — | — | — |
| | | HDI | — | — | — | — | — | — |

TABLE 1-1-continued

|  |  | Example 1 | Example 2 | Example 3 | Example 4 | Example 5 | Example 6 |
|---|---|---|---|---|---|---|---|
| Other components | YD 128 | 40 | 40 | 30 | 34 | 70 | 50 |
|  | YDF 170 | — | — | — | — | — | — |
|  | Diglycerol diglycidyl ether | — | — | 5 | — | — | — |
|  | Diglycerol tetraglycidyl ether | — | — | 5 | — | — | — |
|  | EX-212 | — | — | — | — | — | — |
|  | DICY7 | 8 | 8 | 8 | 8 | 8 | 8 |
|  | A/B | 1.0 | 0.7 | 2.0 | 0.3 | 0.8 | 0.9 |
|  | (A + B)/T | 0.6 | 0.6 | 0.6 | 0.6 | 0.3 | 0.5 |
|  | D/B | — | — | — | — | — | — |

TABLE 1-2

|  |  |  | Example 1 | Example 2 | Example 3 | Example 4 | Example 5 | Example 6 |
|---|---|---|---|---|---|---|---|---|
| Resin properties | Immediately after preparation | Viscosity at 30° C. [Pa · s] | 0.7 | 0.5 | 2.3 | 0.3 | 3.8 | 0.4 |
|  | After being brought into B-stage | Viscosity at 30° C. [Pa · s] | 27000 | 22000 | 36000 | 19000 | 80000 | 20000 |
|  |  | Viscosity at 120° C. [Pa · s]/ viscosity at 30° C. [Pa · s] | 0.003 | 0.008 | 0.009 | 0.002 | 0.009 | 0.005 |
|  | After curing | Glass transition temperature [° C.] | 121 | 125 | 122 | 124 | 131 | 120 |
|  |  | Bending strength [MPa] | 114 | 115 | 117 | 114 | 123 | 113 |
| Molding material for fiber-reinforced composite material |  | Tackiness properties | A | A | A | A | B | A |
|  |  | Rate of flow | S | B | B | B | B | B |

TABLE 2-1

|  |  |  | Example 7 | Example 8 | Example 9 | Example 10 | Example 11 | Example 12 |
|---|---|---|---|---|---|---|---|---|
| Epoxy resin Composition | containing (A) | Diglycidyl ether containing glycerol skeleton | 15 | 25 | — | 20 | 20 | 20 |
|  |  | Diglycidyl ether containing trimethylolpropane skeleton | — | — | 15 | 5 | 5 | 5 |
|  |  | Triglycidyl ether containing diglycerol skeleton | 30 | 10 | — | — | — | — |
|  | Component (B) | Triglycidyl ether containing glycerol skeleton | 15 | 25 | — | 20 | 20 | 20 |
|  |  | Triglycidyl ether containing trimethylolpropane skeleton | — | — | 45 | 15 | 15 | 15 |
|  | Component (D) | 1007 | — | — | — | 5 | — | — |
|  |  | EX-614 | — | — | — | — | 5 | — |
|  |  | SR-6GL | — | — | — | — | — | 5 |
|  | Component (C) | M20S | 28 | 28 | 28 | 28 | 28 | 28 |
|  |  | MI | — | — | — | — | — | — |
|  |  | HDI | — | — | — | — | — | — |
|  | Other components | YD 128 | 30 | 38 | 40 | 20 | 20 | 20 |
|  |  | YDF 170 | — | — | — | 15 | 15 | 15 |
|  |  | Diglycerol diglycidyl ether | 5 | 1 | — | — | — | — |
|  |  | Diglycerol tetraglycidyl ether | 5 | 1 | — | — | — | — |
|  |  | EX-212 | — | — | — | — | — | — |
|  |  | DICY7 | 8 | 8 | 8 | 8 | 8 | 8 |
|  |  | A/B | 3.0 | 1.4 | 0.3 | 0.7 | 0.7 | 0.7 |
|  |  | (A + B)/T | 0.6 | 0.6 | 0.6 | 0.6 | 0.6 | 0.6 |
|  |  | D/B | — | — | — | 0.1 | 0.1 | 0.1 |

TABLE 2-2

|  |  |  | Example 7 | Example 8 | Example 9 | Example 10 | Example 11 | Example 12 |
|---|---|---|---|---|---|---|---|---|
| Resin properties | Immediately after preparation | Viscosity at 30° C. [Pa · s] | 2.7 | 2.1 | 0.7 | 2.8 | 1.6 | 0.9 |
|  | After being brought into B-stage | Viscosity at 30° C. [Pa · s] | 79000 | 66000 | 13000 | 65000 | 31000 | 30000 |
|  |  | Viscosity at 120° C. [Pa · s]/ viscosity at 30° C. [Pa · s] | 0.002 | 0.004 | 0.002 | 0.04 | 0.05 | 0.06 |
|  | After curing | Glass transition temperature [° C.] | 122 | 121 | 120 | 136 | 135 | 133 |
|  |  | Bending strength [MPa] | 117 | 118 | 111 | 122 | 121 | 121 |
| Molding material for fiber-reinforced composite material | Tackiness properties |  | B | B | A | B | A | A |
|  | Rate of flow |  | B | B | B | A | S | S |

TABLE 3-1

|  |  |  | Example 13 | Example 14 | Example 15 | Example 16 | Example 17 |
|---|---|---|---|---|---|---|---|
| Epoxy resin composition | Component (A) | Diglycidyl ether containing glycerol skeleton | 20 | 10 | 20 | 20 | 20 |
|  |  | Diglycidyl ether containing trimethylolpropane skeleton | 5 | 5 | 5 | 5 | 5 |
|  |  | Triglycidyl ether containing diglycerol skeleton | — | — | — | — | — |
|  | Component (B) | Triglycidyl ether containing glycerol skeleton | 20 | 10 | 20 | 20 | 20 |
|  |  | Triglycidyl ether containing trimethylolpropane skeleton | 15 | 10 | 15 | 15 | 15 |
|  | Component (D) | 1007 | — | — | — | — | — |
|  |  | EX-614 | — | — | — | — | — |
|  |  | SR-6GL | 15 | 25 | 5 | 5 | 5 |
|  | Component (C) | M20S | 28 | 28 | — | — | 35 |
|  |  | MI | — | — | 28 | — | — |
|  |  | HDI | — | — | — | 28 | — |
|  | Other components | YD 128 | 20 | 25 | 20 | 20 | 20 |
|  |  | YDF 170 | 5 | 15 | 15 | 15 | 15 |
|  |  | Diglycerol diglycidyl ether | — | — | — | — | — |
|  |  | Diglycerol tetraglycidyl ether | — | — | — | — | — |
|  |  | EX-212 | — | — | — | — | — |
|  |  | DICY7 | 8 | 8 | 8 | 8 | 8 |
|  |  | A/B | 0.7 | 0.8 | 0.7 | 0.7 | 0.7 |
|  |  | (A + B)/T | 0.6 | 0.4 | 0.6 | 0.6 | 0.6 |
|  |  | D/B | 0.4 | 1.3 | 0.1 | 0.1 | 0.1 |

TABLE 3-2

|  |  |  | Example 13 | Example 14 | Example 15 | Example 16 | Example 17 |
|---|---|---|---|---|---|---|---|
| Resin properties | Immediately after preparation | Viscosity at 30° C. [Pa · s] | 1.0 | 1.2 | 0.9 | 0.7 | 0.6 |
|  | After being brought into B-stage | Viscosity at 30° C. [Pa · s] | 36000 | 43000 | 21000 | 18000 | 38000 |
|  |  | Viscosity at 120° C. [Pa · s]/ viscosity at 30° C. [Pa · s] | 0.08 | 0.12 | 0.02 | 0.01 | 0.11 |
|  | After curing | Glass transition temperature [° C.] | 131 | 130 | 128 | 125 | 136 |
|  |  | Bending strength [MPa] | 120 | 127 | 117 | 113 | 126 |

TABLE 3-2-continued

|  |  | Example 13 | Example 14 | Example 15 | Example 16 | Example 17 |
|---|---|---|---|---|---|---|
| Molding material for fiber-reinforced composite material | Tackiness properties | A | A | A | A | A |
|  | Rate of flow | S | S | A | A | S |

TABLE 4-1

|  |  |  | Example 18 | Example 19 | Example 20 | Example 21 | Example 22 |
|---|---|---|---|---|---|---|---|
| Epoxy resin composition | Component (A) | Diglycidyl ether containing glycerol skeleton | 20 | — | 15 | — | — |
|  |  | Diglycidyl ether containing trimethylolpropane skeleton | 5 | 16 | 8 | 8 | 10 |
|  |  | Triglycidyl ether containing diglycerol skeleton | — | — | — | — | — |
|  | Component (B) | Triglycidyl ether containing glycerol skeleton | 20 | — | 15 | — | — |
|  |  | Triglycidyl ether containing trimethylolpropane skeleton | 15 | 50 | 25 | 25 | 30 |
|  | Component (D) | 1007 | — | — | — | — | — |
|  |  | EX-614 | — | — | — | — | — |
|  |  | SR-6GL | 5 | 10 | 25 | 40 | 30 |
|  | Component (C) | M20S | 40 | 28 | 28 | 28 | 28 |
|  |  | MI | — | — | — | — | — |
|  |  | HDI | — | — | — | — | — |
|  | Other components | YD 128 | 20 | 14 | 12 | 12 | 15 |
|  |  | YDF 170 | 15 | 10 | — | 15 | 15 |
|  |  | Diglycerol diglycidyl ether | — | — | — | — | — |
|  |  | Diglycerol tetraglycidyl ether | — | — | — | — | — |
|  |  | EX-212 | — | — | — | — | — |
|  |  | DICY7 | 8 | 8 | 8 | 8 | 8 |
|  |  | A/B | 0.7 | 0.3 | 0.6 | 0.3 | 0.3 |
|  |  | (A + B)/T | 0.6 | 0.6 | 0.6 | 0.3 | 0.4 |
|  |  | D/B | 0.1 | 0.2 | 0.6 | 1.6 | 1.0 |

TABLE 4-2

|  |  |  | Example 18 | Example 19 | Example 20 | Example 21 | Example 22 |
|---|---|---|---|---|---|---|---|
| Resin properties | Immediately after preparation | Viscosity at 30° C. [Pa · s] | 0.5 | 0.7 | 1.5 | 2.3 | 1.8 |
|  | After being brought into B-stage | Viscosity at 30° C. [Pa · s] | 47000 | 36000 | 48000 | 62000 | 49000 |
|  |  | Viscosity at 120° C. [Pa · s]/viscosity at 30° C. [Pa · s] | 0.2 | 0.1 | 0.1 | 0.12 | 0.11 |
|  | After curing | Glass transition temperature [° C.] | 138 | 132 | 131 | 122 | 130 |
|  |  | Bending strength [MPa] | 130 | 124 | 123 | 115 | 121 |
| Molding material for fiber-reinforced composite material | Tackiness properties |  | A | A | A | B | A |
|  | Rate of flow |  | S | S | S | S | S |

TABLE 5-1

|  |  |  | Comparative Example 1 | Comparative Example 2 | Comparative Example 3 | Comparative Example 4 | Comparative Example 5 |
|---|---|---|---|---|---|---|---|
| Epoxy resin composition | Component (A) | Diglycidyl ether containing glycerol skeleton | 45 | — | 10 | 10 | — |
|  |  | Diglycidyl ether containing | — | — | — | — | — |

TABLE 5-1-continued

|  |  | Comparative Example 1 | Comparative Example 2 | Comparative Example 3 | Comparative Example 4 | Comparative Example 5 |
|---|---|---|---|---|---|---|
| Component (B) | trimethylolpropane skeleton Triglycidyl ether containing diglycerol skeleton | — | 30 | — | — | — |
|  | Triglycidyl ether containing glycerol skeleton | 45 | — | 10 | 10 | — |
|  | Triglycidyl ether containing trimethylolpropane skeleton | — | — | — | — | — |
| Component (D) | 1007 | — | 50 | 10 | — | — |
|  | EX-614 | — | — | — | 40 | — |
|  | SR-6GL | — | — | — | — | 20 |
| Component (C) | M20S | 36 | 36 | 20 | 28 | 28 |
|  | MI | — | — | — | — | — |
|  | HDI | — | — | — | — | — |
| Other components | YD 128 | 10 | 10 | 70 | 40 | 60 |
|  | YDF 170 | — | — | — | — | — |
|  | Diglycerol diglycidyl ether | — | 5 | — | — | — |
|  | Diglycerol tetraglycidyl ether | — | 5 | — | — | — |
|  | EX-212 | — | — | — | — | 20 |
|  | DICY7 | 8 | 8 | 8 | 8 | 8 |
|  | A/B | 1.0 | — | 1.0 | 1.0 | — |
|  | (A + B)/T | 0.9 | 0.3 | 0.2 | 0.2 | 0.0 |
|  | D/B | 0.0 | — | 1.0 | 4.0 | — |

TABLE 5-2

|  |  |  | Comparative Example 1 | Comparative Example 2 | Comparative Example 3 | Comparative Example 4 | Comparative Example 5 |
|---|---|---|---|---|---|---|---|
| Resin properties | Immediately after preparation | Viscosity at 30° C. [Pa · s] | 0.3 | 12.5 | 7.8 | 11.5 | 3.5 |
|  | After being brought into B-stage | Viscosity at 30° C. [Pa · s] | 2000 | 700000 | 600000 | 760000 | 980 |
|  |  | Viscosity at 120° C. [Pa · s]/ viscosity at 30° C. [Pa · s] | 0.001 | 0.004 | 0.0006 | 0.003 | 0.0001 |
|  | After curing | Glass transition temperature [° C] | 113 | 122 | 120 | 117 | 102 |
|  |  | Bending strength [MPa] | 108 | 103 | 104 | 103 | 98 |
| Molding material for fiber-reinforced composite material |  | Tackiness properties | B | C | C | C | C |
|  |  | Rate of flow | C | B | C | B | C |

INDUSTRIAL APPLICABILITY

Our epoxy resin composition is superior to the conventional epoxy resin compositions in that it is excellent in impregnating properties into the reinforcing fiber, the viscosity of the epoxy resin after thickening is controlled in the optimum range, the variation in viscosity due to the temperature rise is small, the epoxy resin composition is excellent in heat resistance, the epoxy resin composition provides a molding material for a fiber-reinforced composite material that is excellent in flexibility during handling and flowability during press forming, and use of the molding material for a fiber-reinforced composite material provides a fiber-reinforced composite material excellent in heat resistance and mechanical properties. As a result, fiber-reinforced composite materials will be applied more widely to sports and industrial applications in addition to aerospace applications and automobile applications, leading to a reduction in energy consumption centered on fossil fuels, and contribution to the problem of global warming is expected.

The invention claimed is:

1. An epoxy resin composition comprising components (A) to (C):
   the component (A): an aliphatic epoxy resin having 1 hydroxyl group and 2 or more and 3 or less epoxy groups in a molecule;
   the component (B): an aliphatic epoxy resin having 0 hydroxyl groups and 3 epoxy groups in a molecule; and
   the component (C): a polyisocyanate compound,
   the epoxy resin composition satisfying:

$0.125 \leq A/B \leq 3$ and $0.2 < (A+B)/T \leq 0.8$, wherein

A is parts by mass of the component (A), B is parts by mass of the component (B), and T is total parts by mass of an epoxy resin in the epoxy resin composition.

2. The epoxy resin composition according to claim 1, further comprising a component (D):

the component (D): an epoxy resin having 2 or more hydroxyl groups and 2 or more epoxy groups in a molecule, the epoxy resin composition satisfying:

$$0.1 \leq D/B \leq 2, \text{ wherein}$$

D is parts by mass of the component (D).

3. The epoxy resin composition according to claim 2, wherein the component (D) is an aliphatic epoxy resin.

4. The epoxy resin composition according to claim 2, wherein a total carbon number in a molecule of the epoxy resin as the component (D) is 20 or more and 50 or less.

5. The epoxy resin composition according to claim 1, wherein the component (B) is an aliphatic epoxy resin represented by general formula (1):

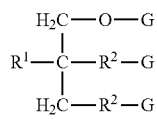

(1)

-continued

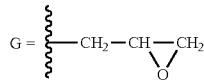

wherein $R^1$ represents H or an aliphatic chain having a carbon number of 1 or more and 6 or less, and optionally contains a cyclic structure and/or a heteroatom, and $R^2$ represents O or an aliphatic chain having a carbon number of 1 or more and 6 or less, and optionally contains a cyclic structure and/or a heteroatom.

6. The epoxy resin composition according to claim 1, wherein the component (C) satisfies:

$$1 \leq I/W \leq 2, \text{ wherein}$$

I is a number of isocyanate groups of the component (C) in the epoxy resin composition, and W is a total number of hydroxyl groups in the epoxy resin in the epoxy resin composition.

7. The epoxy resin composition according to claim 1, wherein a cured resin of the epoxy resin composition has a glass transition temperature of 120° C. or more.

8. A molding material for a fiber-reinforced composite material, the molding material comprising the epoxy resin composition according to claim 1 and a reinforcing fiber.

9. A fiber-reinforced composite material comprising a cured resin of the epoxy resin composition according to claim 1, and a reinforcing fiber.

10. The fiber-reinforced composite material according to claim 9, wherein the reinforcing fiber is a carbon fiber.

* * * * *